S. TONEY.
COMBINATION TRACK GAGE AND LEVEL.
APPLICATION FILED MAR. 10, 1916.
1,220,027.
Patented Mar. 20, 1917.
2 SHEETS—SHEET 1.
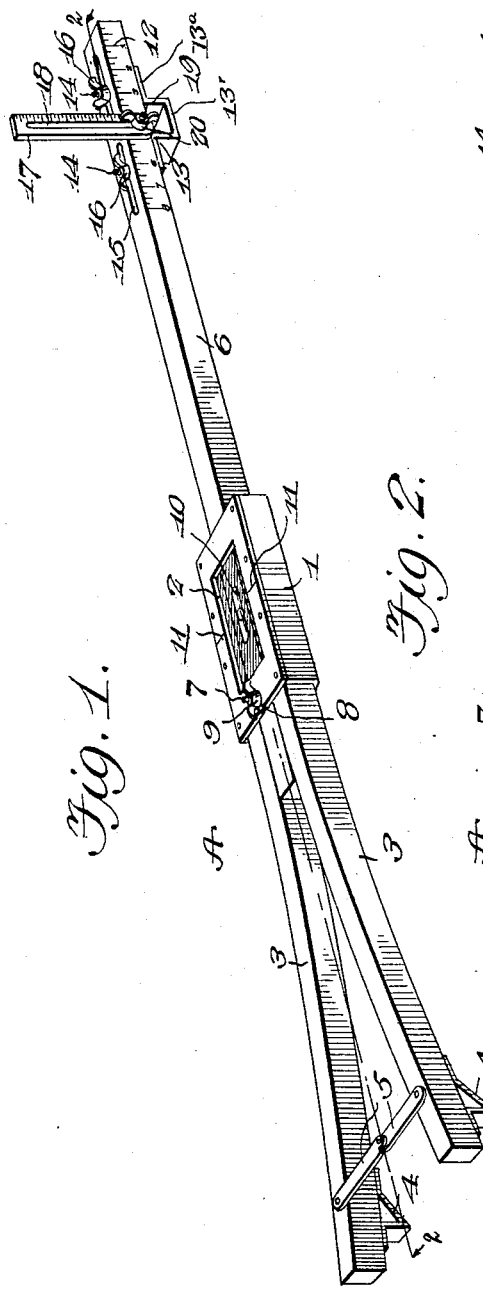
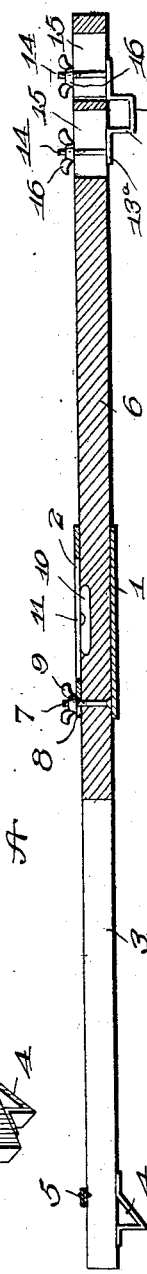
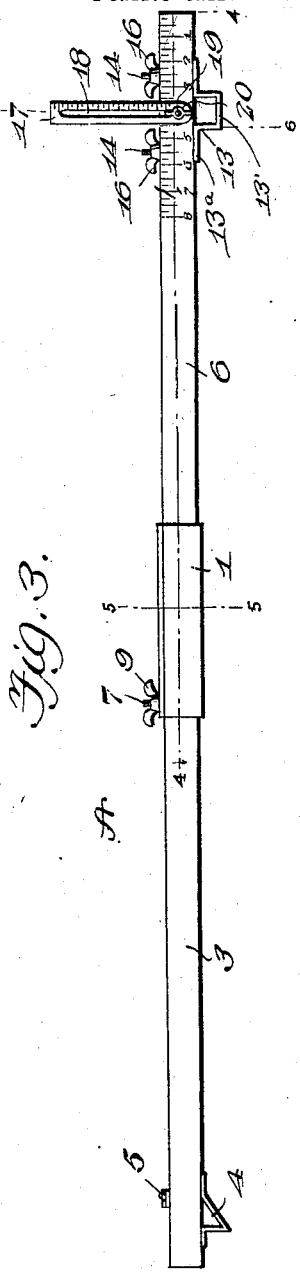
Witnesses
Inventor
Samuel Toney
By Victor J. Evans
Attorney S. TONEY.
COMBINATION TRACK GAGE AND LEVEL.
APPLICATION FILED MAR. 10, 1916.
1,220,027.
Patented Mar. 20, 1917.
2 SHEETS—SHEET 2.
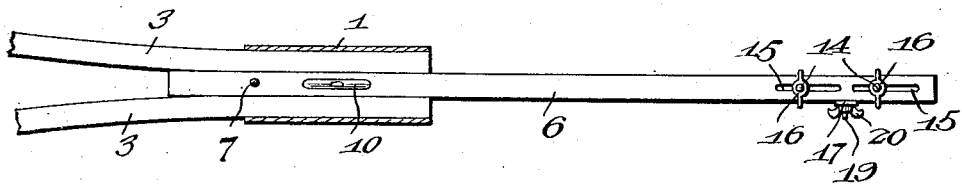
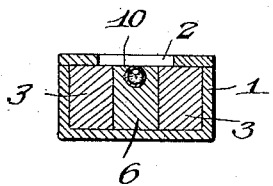 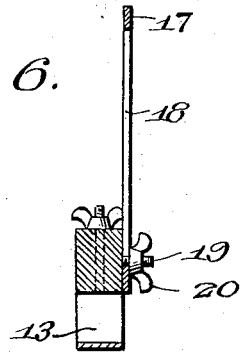
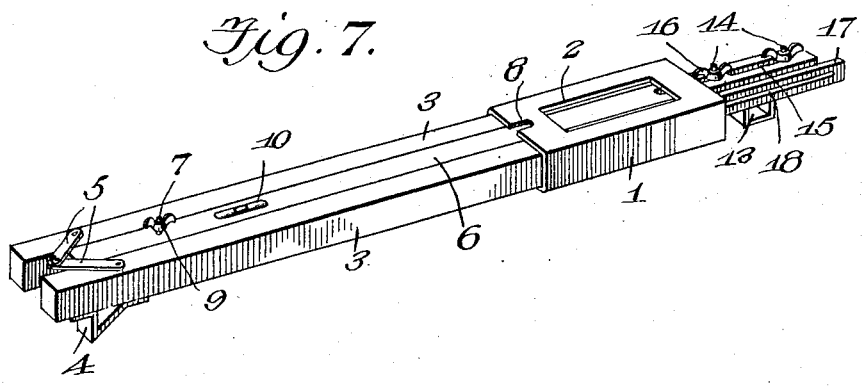
Inventor
Samuel Toney
Witnesses
By Victor J. Evans
Attorney

UNITED STATES PATENT OFFICE.

SAMUEL TONEY, OF CLEARFIELD, PENNSYLVANIA.

COMBINATION TRACK GAGE AND LEVEL.

1,220,027.   Specification of Letters Patent.   Patented Mar. 20, 1917.

Application filed March 10, 1916.   Serial No. 83,388.

*To all whom it may concern:*

Be it known that I, SAMUEL TONEY, a citizen of the United States, residing at Clearfield, in the county of Clearfield and State of Pennsylvania, have invented new and useful Improvements in Combination Track Gages and Levels, of which the following is a specification.

The present invention relates to combined track gages and levels, and the object of the invention is to produce an apparatus of this class which shall be of an extremely simple and thoroughly efficient construction wherein the weight of the same will be reduced to permit of the device being readily carried by the operator.

It is a further object of the invention to produce a device of this kind which shall be collapsible or foldable and will occupy only a small amount of space when not in use or when stored.

With the above and other objects in view, the improvement resides in the construction, combination and arrangement of parts set forth in the following specification and falling within the scope of the appended claims.

In the drawings:

Figure 1 is a perspective view illustrating the application of my improvement,

Fig. 2 is a central longitudinal sectional view through the same, taken approximately on the line 2—2 of Fig. 1, Fig. 3 is a side elevation of the same, Fig. 4 is a detail sectional view approximately on the line 4—4 of Fig. 3, Fig. 5 is a transverse sectional view approximately on the line 5—5 of Fig. 3, Fig. 6 is a vertical sectional view approximately on the line 6—6 of Fig. 3, and Fig. 7 is a perspective view of the device in its folded or collapsed condition.

In the drawings, A designates the improvement in its entirety. The improvement contemplates the employment of a substantially rectangular sleeve or casing 1 which has its upper plate preferably detachably connected with its lower plate and sides and its said upper plate formed with an elongated slot or opening 2. Secured in the casing and contacting with the opposite sides thereof are the leg members 3—3 of the improvement. These legs are preferably constructed of wood and are bendable longitudinally, the said legs upon their underfaces and adjacent their free ends being provided with gage lugs 4 and the legs are connected adjacent the said ends by a pair of pivoted links 5. The links 5 have their connected ends in the form of a carriage joint, so that when the same are swung in a spreading position in one direction, the said links will be retained in a line one with the other. The outer ends of the legs are, of course, spread when the links are brought to longitudinal alinement.

The numeral 6 designates the sliding member which is arranged in the casing and which has its outer sides engaging with the inner sides of the legs 3. The outward movement of the member 6 is limited by a bolt member 7 being received in a depression 8 in the upper plate of the casing 1, the said bolt member being provided with a thumb screw 9 which is adapted to contact with the said upper plate of the casing and hold the member 6 in proper relation to the casing when in its outer or spread condition. The member 6 upon its outer face is provided with a spirit tube 10, the bubble of which being arranged centrally of the top plate of the casing when the said member 6 is in its outward condition and the said bubble may register with indicating marks 11 upon the top of the casing to the opposite sides of its elongated slot or opening 2.

The outer end of the slidable member 6 upon one or both of its sides is provided with graduation marks 12, the same being of the inch scale and the said member upon its underface is provided with a movable gage lug 13. The gage lug 13 is preferably constructed from a single strip of flat metal bent to provide a square or rectangular central portion 13′ which is formed with outwardly extending parallel arms 13ᵃ. These arms are provided with bolt members 14 that pass through elongated slots 15 in the members 6 and the said bolts are engaged by winged nuts 16 to hold the member 13 adjusted upon the member 6. By constructing the body of the member 13 square or rectangular it will be noted that the block may be employed to contact with either of the sides of the head of a rail as well as with a guard rail. Also arranged upon the said outer end of the member 6 is an elevation block or blade 17, the same being provided with suitable graduation marks and comprising a flat substantially rectangular member which is provided for the major portion of its length with a slot 18, a bolt 19 being arranged transversely of the member 6 or projecting from one of the sides of said member and passes through the slot while a wing nut 20 engages with the said bolt. By this arrangement it will be noted that the member 17 may be arranged vertically with respect to the member 6 when in use or the same may be folded and held against the side of the said member when not in use. The inner bolt member 15 and the nut 16 engaging therewith will contact with the outer edge of the casing 1 when the member 6 is moved inwardly between the lugs 4 and the device is in its collapsed or folded condition.

Having thus described the invention, what I claim is:

1. In a device for the purpose set forth, a casing, leg members extending longitudinally of the casing and having lugs thereon, a spreader member connecting the legs at the outer ends thereof, said spreader member when moved to one position adapted to spread the ends of the said legs away from each other, a slidable member arranged in the casing between the legs, a gage lug on the slidable member, and means upon the slidable member co-acting with the casing for limiting and retaining the slidable member in its outward position with respect to the casing.

2. In a device for the purpose set forth, a casing, leg members secured in the casing and extending longitudinally thereof, a spreader member for the legs, gage lugs upon the legs, a slidable member arranged within the casing between the legs, means for limiting the outward movement of the slidable member with relation to the casing, means for locking the slidable member upon the casing in such condition, and a movable gage lug upon the slidable member.

3. In a device for the purpose set forth, a substantially rectangular casing having its top provided with an opening, leg members secured in the casing and extending longitudinally therethrough, a spreader member pivotally connected with the legs, gage lugs upon the legs, a movable member passing through the casing and disposed between the legs, means for limiting the sliding movement of the movable member through the casing, means for locking the slidable member to the casing when the said slidable member is in its outward position, a spirit bulb upon the slidable member and adapted to be disclosed through the opening in the casing when the said slidable member is in its outward position, and a movable gage lug upon the slidable member.

4. In a device for the purpose set forth, a casing, leg members secured to the sides of the casing and extending longitudinally of the casing, gage lugs upon the legs, a pivoted spreader member secured adjacent the ends of the legs, a slidable member arranged in the casing between the legs, means for limiting the outward movement of the slidable member with relation to the casing, means for locking the slidable member to the casing in such condition, a level bulb upon the slidable member, a movable lug upon the slidable member adjacent the outer end thereof, means for locking the lug in adjusted positions upon the movable member, said movable member having one of its sides provided with a scale graduation, a graduated elevation blade for the said slidable member, said blade having an elongated slot, a threaded element upon the slidable member and passing through the slot, and a nut for the threaded member.

In testimony whereof I affix my signature in presence of two witnesses.

SAMUEL TONEY.

Witnesses:
LUTHER M. HUBLER,
RUSSELL BRATTON.

Copies of this patent may be obtained for five cents each, by addressing the "Commissioner of Patents, Washington, D. C."